May 30, 1961     R. P. MATTHEWS     2,986,351

TOROIDAL COIL WINDING MACHINE

Filed May 22, 1957

INVENTOR:
ROBERT P. MATTHEWS
BY
Edward L. Amonette

AGENT

United States Patent Office 2,986,351
Patented May 30, 1961

2,986,351

TOROIDAL COIL WINDING MACHINE

Robert P. Matthews, 1606 Inez Drive NE.,
Albuquerque, N. Mex.

Filed May 22, 1957, Ser. No. 660,924

7 Claims. (Cl. 242—4)

My invention relates to machines for winding coils upon toroidal cores, and more particularly to a supporting and driving means for the wire-carrying shuttle used in such machines.

In general, toroidal coil winding machines include a ring-like shuttle which is separable for linking a toroidal core or coil form. A supply of wire is wound on the shuttle and the direction of rotation of the shuttle is then reversed, so that the wire is transferred, one turn per revolution, to the core. As the winding builds up on the core, the space in the center of the toroid, through which the shuttle must pass, decreases until there is no longer room for the shuttle. Then winding must cease, or be continued by a needle and thread technique which is slow and therefore costly.

In recent years the use of toroidal coils has greatly increased, particularly in electronic computers and airborne telemetering equipment. In both applications conservation of space is important, leading to extensive programs for miniaturization of electronic equipment. Reduction in the size of toroidal coils not only decreases the space requirements for the coils themselves, but lessens the power requirements, thereby further decreasing the space necessary to house a particular circuit.

Designers of toroidal coils soon found that there was a lower limit to the size of coils which could be efficiently produced, dictated by the size of the cross section of the shuttle used. Since, in coil winders of the prior art, the shuttle was driven by gears or cams exerting considerable compressive or expansive force on the shuttle and hence subjecting it to stresses and strains, the cross section of the shuttle necessarily had to be large enough to prevent deformation of the shuttle. If the shuttle were deformed it would not run true and would wobble, producing an irregular winding and slowing down the action of the winding machine. In the prior art, then, finished machine-wound coils had minimum center diameters of .070 to .090 inch.

Certain machines have been devised to wind coils having smaller centers, using a needle and thread technique which is clumsy and slow. The major disadvantage of this technique is that it is possible to wind only comparatively small windings, necessitating splicing of the wire if large windings are in order.

By using my invention it is possible to speedily wind toroidal coils having finished centers of .035 inch or less, as well as larger coils if desired. The shuttle on my machine retains a large capacity for wire, however. For instance, 60 circular-mil-feet of wire may be carried by the shuttle used in winding a coil having a finished center of .035 inch. A coil with a finished center of 1/16 inch can be wound with 350 circular-mil-feet of wire, compared to 235 circular-mil-feet possible with a well-known machine of the prior art. A speed of winding of up to 1000 turns per minute is possible.

The shuttle used on my improved machine is not too different from those of the prior art, except in size. In winding the coil having a .035 inch center, I use a shuttle 2 inches in diameter and having a cross section which can be bounded by a .030 inch circle. It is obvious that a shuttle of these dimensions will not withstand much in the way of expansive or compressive forces without distorting and thereby producing the inferior results before mentioned. Therefore I have devised novel means of supporting and driving the shuttle utilizing strong localized magnetic forces.

These magnetic forces are applied to the shuttle, which is magnetic, by a number of guide rollers, supporting the shuttle in its plane of rotation. The rollers are positioned so as to exert no mechanical forces on the shuttle in the absence of the magnetizing force; and one or more of the magnetized rollers is driven in rotation to drive the shuttle. Thus, a very smooth transmission means is secured, exerting a minimum of mechanical stress on the fragile shuttle, and making possible its very rapid planar rotation. As a result, uniform toroidal coils having small finished centers may be quickly wound.

A more detailed understanding of my invention and the operation thereof may be had by reading the description to follow in conjunction with the accompanying drawing, in which.

Figure 1:
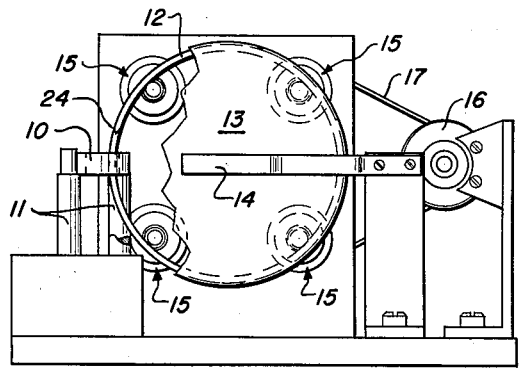
Fig. 1 is a side view of a toroidal coil winding machine embodying a preferred construction of my invention.
Figure 2:
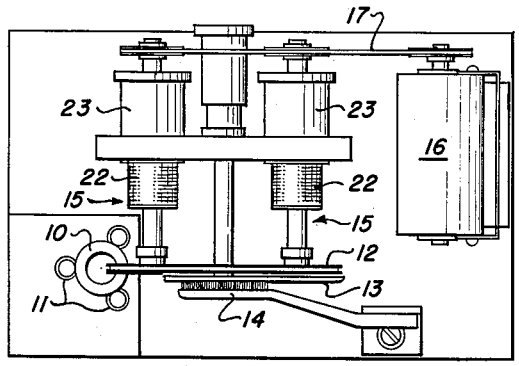
Fig. 2 is a top view of the machine shown in Fig. 1.
Figure 3:
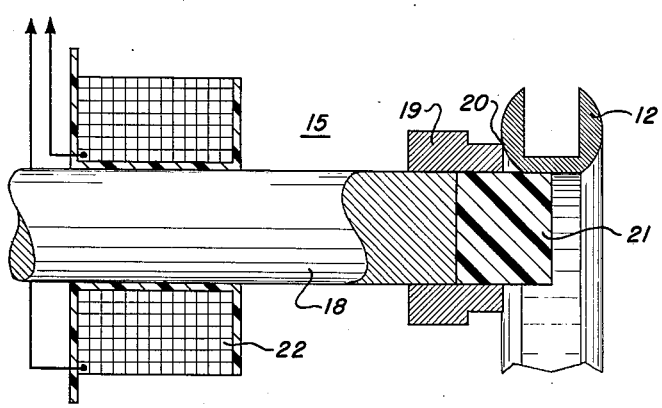
Fig. 3 is a sectional view of a magnetic guide roller employed in the machine of the preceding two figures, showing its relationship to the shuttle.

Referring now to Figs. 1 and 2, toroidal core 10 is seen to be supported by three rollers 11, the spacing of which is adjustable to accommodate cores of different sizes. The use of such supports is old in the art and warrants no further description, except to say that they are usually employed also to rotate the core during the winding operation so that an even winding may be secured. Shuttle 12 is separable at point 24 so that it can be placed into position, linking the core, and then rejoined. A brief reference to Fig. 3 shows the annular groove in the shuttle for carrying the load of wire to be wound on the core.

Guide plate 13 is made of a nonmagnetic material and positioned so as to barely clear the shuttle, the purpose of the guide plate being to encourage free transfer of a loop of wire from the shuttle to the core with every revolution of the shuttle. The transfer is further encouraged by use of a wire slider (not shown) which rides atop the wire supply in the annular groove of the shuttle and prevents disorderly unwinding of the wire from the shuttle. During winding, each loop is pulled from the shuttle at a point diametrically opposite the core and passes between the guide plate 13 and brush 14. The brush restrains the loop, insuring its being wound on the core under tension so as to obtain a tight, orderly winding. This cooperative action of the shuttle, guide plate, brush and slider is well-known and common to many machines of the prior art and therefore will not be discussed in detail.

Still referring to Figs. 1 and 2, the shuttle is seen to be supported and driven by four guide rollers 15 which are rotated by motor 16 through belt 17. Each guide roller is supported by a bearing 23. Fig. 3, which is a longitudinal sectional view of a guide roller, shows in greater detail how the shuttle is supported and driven thereby. The guide roller is seen to have a magnetic shaft 18 upon which is pressed a magnetic end piece 19. These two portions are preferably made of Norway iron, which has the properties of high permeability and low retentivity. If desired, the shaft and end piece may be tooled as a single member, but I have found that the construction shown in advantageous because it is easily assembled and because the end piece is easily replaced when it becomes worn from use. If the shaft and end piece were integral, replacement of the worn part would necessarily mean shaft replacement also, making the process unnecessarily complicated.

Shuttle 12 is shown in cross section, and is seen to have rounded sides to give it the necessary stiffness and strength. End piece 19, due to its having a generally cylindrical shape of radius considerably smaller than that of the shuttle, bears against the shuttle only at one point of contact indicated at 20. The fact that contact is made only at one point is important in the elimination of friction between the end piece and the shuttle, and is most important in an alternate scheme of driving, as will be seen later. With the driving scheme shown in Figs. 1 and 2 more friction can be tolerated and the contact relationship of the end piece and the shuttle is not critical.

A cylindrical nonmagnetic portion 21 fits tightly within the end piece, as an extension of the shaft, and serves to center the shuttle when the several guide rollers are correctly located in the machine. Portion 21 is preferably made of self-lubricating bearing material, such as tetrafluoroethylene resin, sold under the trademark Teflon, for reasons which will be explained later. Electrical coil 22 is wound on a bobbin and fitted over shaft 18 and its leads connected to a voltage source (not shown). The resultant magentic field then is concentrated in the magnetic shaft and end piece and is even more concentrated at the point of contact between the end piece and the shuttle. The shuttle is thus attracted by a force acting perpendicular to its plane and no radial forces are applied to it. By reason of the point contact maintained between the end piece and the shuttle, a very high magnetic gradient is obtained, creating the strongest attractive force possible for a given coil and a given voltage. Now, as the guide roller is rotated by the means shown in Figs. 1 and 2, the point of application of the attractive force smoothly describes a circumferential line on the side of the shuttle and the shuttle is rotated.

Since the driving force is applied to the side of the shuttle, the contacting portions of the end piece and the shuttle necessarily move at the same velocity. The contacting portions of nonmagnetic portion 21 and the shuttle do not move with the same velocity, since the shaft and shuttle rotate about different centers. Therefore a sliding friction will be present and it is seen why it is desirable that portion 21 furnish some sort of lubrication; although successful operation could be attained if portion 21 were not lubricated, or even if the portion were made of magnetic material.

Since three points determine a plane, it is seen that a minimum of three guide rollers is necessary to support the shuttle in its plane of rotation. Of the three, at least two must be magnetized in order to hold the shuttle in an upright position. Of the two magnetized guide rollers, only one need be driven to cause the shuttle to rotate. Although such a driving and supporting system is not shown in the drawing, it will be obvious to one skilled in the art how such a system would be derived from that shown as a preferred embodiment. The driving motor, for instance, could be located on the end of the shaft of the driven guide roller, instead of using a belt and pulley. It is when only one guide roller is driven that friction in the driving and supporting means must be minimized, dictating the use of the guide roller and shuttle shapes shown in Fig. 3, or other shapes, to produce a point-contact relationship between the two members.

The embodiment shown in Figs. 1 and 2, in which four magnetized guide rollers are used, and all four are driven by motor 16, has several advantages. First, the driving force is applied to the shuttle equally at four places, creating much less stress within the shuttle than would be created if only one guide roller were driven. Second, I have found that by magnetizing each guide roller with opposite polarity magnetization from that of the guide rollers adjacent thereto, the shuttle is utilized as part of the magnetic circuit, so that a stronger attractive force is secured as a result of the increased efficiency of the circuit. This is an important advantage as larger and larger shuttles are used in the winder. It is not so important, but it is still useful, when applied to the smaller shuttles. If all four guide rollers were magnetized with the same polarity at their points of contact with the shuttle, there would be no mutual use of the shuttle as part of the magnetic circuits, each guide roller having a long air path as part of its magnetic circuit. This would require a larger coil 22 to produce a given holding power. It is apparent that the scheme of magnetizing the guide rollers with alternate polarities as the shuttle circumference is traversed is applicable to any even number of guide rollers.

When use is made of the smallest shuttle, whose cross sectional diameter is .030 inch or less, care must be taken in handling the shuttle not to deform it, or it will not run true and good toroidal windings will not be obtained. In this connection, I have found it expedient to manufacture the magnetic portions of the magnetized guide rollers out of Norway iron, as before mentioned. This is to make use of the low retentivity of that material. Then, when it is desired to change shuttles, the power can be disconnected from the guide roller coils and immediately nearly all of the magnetic force will be removed from the shuttle, allowing its easy removal without any danger of deformation.

I have described a novel supporting and driving means for use in a toroidal coil winder, which is particularly useful to accomplish the winding of miniature and subminiature toroidal coils quickly and neatly. However, in no case do I intend to limit the invention to the making of such small coils. Its advantages are also applicable to the winding of larger coils. Although I have shown one preferred embodiment of my invention, it is not my intention that the invention be limited thereto, as it may assume other forms as herein described and as will be apparent to one skilled in the art. The sphere and scope of my invention is defined by the claims below.

I claim as my invention:

1. In a machine for winding a coil upon a toroidal core, said machine having an inflexible circular ring-like magnetic shuttle which links the core and transfers wire thereto, driving and supporting means for the shuttle comprising at least three guide rollers spaced about said shuttle, means for magnetizing at least two of the guide rollers, each magnetizable roller having an extended nonmagnetic portion in rolling contact with the inner periphery of said shuttle and having a magnetic portion with an arcuate edge disposed against a side of said shuttle whereby said shuttle is supported in its plane of rotation by magnetic forces acting perpendicular to said plane and by said extended nonmagnetic portion, and means for rotating at least one of said two guide rollers whereby said shuttle will be driven to rotate in said plane.

2. Shuttle driving and supporting means as in claim 1 including an even number of guide rollers and means for magnetizing each with a polarity opposite that of the guide rollers adjacent thereto.

3. In a machine for winding a coil upon a toroidal core, said machine having an inflexible circular ring-like magnetic shuttle with an arcuate side, which links the core and transfers wire thereto, supporting means for the shuttle comprising four guide rollers spaced about said shuttle, each guide roller having a cylindrical nonmagnetic portion and a cylindrical magnetic portion mounted coaxially outside of said nonmagnetic portion and offset along the common axis so that the nonmagnetic portion extends beyond the magnetic portion in rolling contact with the inner periphery of said shuttle, a peripheral edge of said magnetic portion making contact with the side of said shuttle, means for magnetizing each guide roller and means for driving at least one of said guide rollers whereby said shuttle will be rotated.

4. Shuttle supporting means as in claim 11, including means for magnetizing each guide roller with a polarity opposite that of adjacent guide rollers.

5. Shuttle driving and supporting means as in claim 4, wherein all four guide rollers are driven.

6. Shuttle driving and supporting means as in claim 4, wherein said nonmagnetic portion of each guide roller is made of self-lubricating bearing material.

7. A magnetic guide roller for supporting the magnetic shuttle of a toroidal coil winding machine, comprising a rotatable magnetic shaft having a cylindrical end portion with a peripheral edge for bearing against the side of the shuttle, a cylindrical nonmagnetic portion of smaller diameter than the magnetic portion and mounted coaxially contiguous with the magnetic portion and adapted to make rolling contact with the inner periphery of the shuttle, and means for magnetizing the shaft.

References Cited in the file of this patent

UNITED STATES PATENTS

| | | |
|---|---|---|
| 1,316,110 | Ronan | Sept. 16, 1919 |
| 2,709,051 | Bunch | May 24, 1955 |

FOREIGN PATENTS

| | | |
|---|---|---|
| 594,091 | France | June 13, 1925 |